United States Patent
Plonka et al.

(10) Patent No.: US 10,931,695 B2
(45) Date of Patent: Feb. 23, 2021

(54) NONCE INJECTION AND OBSERVATION SYSTEM FOR DETECTING EAVESDROPPERS

(71) Applicant: Akamai Technologies, Inc., Cambridge, MA (US)

(72) Inventors: David J. Plonka, Madison, WI (US); Kyle R. Rose, Somerville, MA (US); Laura M. Roberts, Princeton, NJ (US)

(73) Assignee: Akamai Technologies, Inc., Cambridge, MA (US)

( * ) Notice: Subject to any disclaimer, the term of this patent is extended or adjusted under 35 U.S.C. 154(b) by 58 days.

(21) Appl. No.: 16/109,454

(22) Filed: Aug. 22, 2018

(65) Prior Publication Data
US 2020/0067954 A1 Feb. 27, 2020

(51) Int. Cl.
*H04L 29/06* (2006.01)
*H04W 12/02* (2009.01)

(52) U.S. Cl.
CPC ...... *H04L 63/1425* (2013.01); *H04L 63/0281* (2013.01); *H04L 63/0428* (2013.01); *H04L 63/166* (2013.01); *H04W 12/02* (2013.01)

(58) Field of Classification Search
CPC . H04L 63/14; H04L 63/1408; H04L 63/1416; H04L 63/1425; H04L 63/1433; H04L 63/1441; H04L 63/1475; H04L 63/1483; H04L 63/1491; H04L 63/20; H04L 63/166
See application file for complete search history.

(56) References Cited

U.S. PATENT DOCUMENTS

| | | |
|---|---|---|
| 6,820,133 B1 | 11/2004 | Grove et al. |
| 7,111,057 B1 | 9/2006 | Wein et al. |
| 7,165,116 B2 | 1/2007 | Grove et al. |
| 7,240,100 B1 | 7/2007 | Wein et al. |
| 7,274,658 B2 | 9/2007 | Bornstein et al. |
| 7,296,082 B2 | 11/2007 | Leighton et al. |
| 7,313,815 B2 | 12/2007 | Pazi et al. |

(Continued)

OTHER PUBLICATIONS

Farsight Security, "Farsight Security Passive DNS project introduction," 2 pages. Downloaded Feb. 4, 2019 from https://www.farsightsecurity.com/technical/passive-dns.

(Continued)

*Primary Examiner* — Edward Zee (57) ABSTRACT

An entity can disseminate nonces by introducing them into various aspects of network traffic, and then listening for them, thereby detecting eavesdroppers on the Internet. A nonce may be numeric, alphanumeric, or otherwise; nonces are contextually appropriate to how they are disseminated. Preferably, a nonce is disseminated by incorporating it into some aspect of network traffic. For example, a nonce can be placed in a network identifier such as an IP address or domain name label. Correlating the circumstances under which the nonce was disseminated and under which it was observed to "propagate", intelligence about who is eavesdropping on what portions of the Internet can be derived. Such intelligence can be put to many uses, including reporting on eavesdroppers, routing traffic around eavesdroppers, developing reputation scores, and adopting enhanced obfuscation/privacy/security techniques.

22 Claims, 7 Drawing Sheets

(56) References Cited

U.S. PATENT DOCUMENTS

| | | | |
|---|---|---|---|
| 7,376,716 | B2 | 5/2008 | Dilley et al. |
| 7,472,178 | B2 | 12/2008 | Lisiecki et al. |
| 7,552,338 | B1 | 6/2009 | Swildens et al. |
| 7,660,296 | B2 | 2/2010 | Fletcher et al. |
| 8,271,793 | B2 | 9/2012 | Swildens et al. |
| 8,458,769 | B2 | 6/2013 | Summers et al. |
| 8,875,287 | B2 | 10/2014 | Ludin et al. |
| 9,736,258 | B2 | 8/2017 | Holland et al. |
| 2003/0093523 | A1 | 5/2003 | Cranor et al. |
| 2006/0203733 | A1 | 9/2006 | Grant et al. |
| 2010/0088766 | A1 | 4/2010 | Michaely et al. |
| 2011/0173345 | A1 | 7/2011 | Knox et al. |
| 2012/0124372 | A1 | 5/2012 | Dilley et al. |
| 2013/0151857 | A1* | 6/2013 | Agrawal ............... H04L 63/126 713/178 |
| 2013/0298238 | A1 | 11/2013 | Shah et al. |
| 2017/0237773 | A1 | 8/2017 | Wallace et al. |
| 2017/0251014 | A1* | 8/2017 | Eisen .................. G06F 11/3055 |
| 2018/0013788 | A1 | 1/2018 | Vissamsetty et al. |
| 2019/0044974 | A1 | 2/2019 | Hayward et al. |

OTHER PUBLICATIONS

Aura, T., "Cryptographically Generated Addresses (CGA)," IETF RFC 3972, Mar. 2005, 22 pages.
Bernstein, Daniel, "ChaCha, a variant of Salsa20," 2008, 6 pages.
Beverly, Robert, "Yarrp'ing the Internet: Randomized High-Speed Active Topology Discovery," in Proceedings of the ACM Internet Measurement Conference (IMC), Nov. 2016, 8 pages. Downloaded Feb. 6, 2019, from http://rbeverly.net/research/papers/yarrp-imc16. pdf.
Beverly, Robert et al., "In the IP of the Beholder: Strategies for Active IPv6 Topology Discovery," in Proceedings of the Internet Measurement Conference 2018, ser. IMC, '18. New York, NY, USA: ACM, 2018, pp. 308-321., 14 pages. [Online]. Available: http://doi.acm.org/10.1145/3278532.3278559, downloaded Feb. 6, 2019 from https://www.akamai.com/us/en/multimedia/documents/technical-publication/strategies-for-active-ipv6-topology-discovery. pdf.
Edmonds, Robert, "ISC Passive DNS Architecture", Internet Systems Consortium Inc., Mar. 2012, 18 pages.
Edmonds, Robert et al., "Passive DNS Hardening", downloaded from https://www.farsightsecurity.com/assets/media/download/passive_dns_hardening_handout.pdf, Feb. 4, 2018, presentation dated 2010 according to https://www.farsightsecurity.com/technical/passive-dns/, Internet Systems Consortium INc, 40 pages.
Farrell, "Pervasive Monitoring is an Attack," RFC 7258, Internet Engineering Task Force, May 2014. 6 pages. [Online]. Available: https://tools.ietf.org/html/rfc7258.
Finjan Blog, Finjan Team, "How Honeytokens are Used to Track Cybercriminals," May 14, 2018, https://blog.finjan.com/honeytokens-used-to-track-cybercriminals, 12 pages.
McRae, Craig et al., "Phighting the Phisher: Using Web Bugs and Honeytokens to Investigate the Source of Phishing Attacks," 2007 40th Annual Hawaii International Conference on System Sciences (HICSS'07), pp. 270c-270c, 2007., downloaded Feb. 6, 2019 from http://citeseerx.ist.psu.edu/viewdoc/download?doi=10.1.1.107.7339 &rep=rep1&type=pdf, 7 pages.
Honeytokens: The Other Honeypot, Jul. 16, 2003, 8 pages. https://en-us.reddit.com/login?dest=https%3A%2F%2Fen-us.reddit.com%2Fsubmit%3Furl%3Dhttp%253A%252F%252Fwww.symantec.com%252Fconnect%252Farticles%252Fhoneytokens-other-honeypot.
Abdelallahelhadj, et al., An Experimental Sniffer Detector: SnifferWall, Sep. 2002, 12 pages., downloaded on Jul. 27, 2018, from http://www.lsv.fr/~goubault/SECI-02/Final/actes-seci02/pdf/008-Abdelallahelhadj.pdf.
Cole, et al., Honeypots: A Security Manager's Guide to Honeypots, downloaded on Jul. 26, 2018, 4 pages. https://www.sans.edu/cyber-research/security-laboratory/article/honeypots-guide.
Grundschober, et al., Design and Implementation of a Sniffer Detector, downloaded Jul. 26 2018, 13 pages. http://www.raid-symposium.org/raid98/Prog_RAID98/Full_Papers/sniffer_detector. html/index.htm.
Grundschober, et al., List of accepted papers, downloaded on Jul. 26, 2018, 2 pages. http://www.raid-symposium.org/raid98/Prog_RAID98/Talks.html#Grundschober_31.
Grundschober, Sniffer Detector Report, Jun. 1998, 78 pages.
Li, Fangfan et al., lib-erate, (n) : A library for exposing (traffic-classification) rules and avoiding them efficiently, IMC '17, Nov. 1-3, 2017, London, United Kingdom, 14 pages.
Pouget, et al., Eurecom, White Paper: Honeypot, Honeynet, Honeytoken: Terminological issues1, Sep. 14, 2003, 26 pages.
Provos, A Virtual Honeypot Framework, 13th USENIX Security Symposium, Aug. 2004, San Diego CA, USA, 38 pages, downloaded on Jul. 31, 2018. https://www.usenix.org/legacy/event/sec04/tech/full_papers/provos/provos_html/.
Spitzner, Honeytokens: The Other Honeypot, Jul. 16, 2003, 3 pages. (http://en-us.reddit.com/submit?url=http://www.symantec.com/connect/articles/honeytokens-other-honeypot) (/connect/forward?path=node/1234461).
Spitzner, Honeytokens: The Other Honeypot, Jul. 17, 2003, 5 pages.
Wikipedia, Honeypot (computing), downloaded on Jul. 26, 2018, 5 pages. https://en.wikipedia.org/wiki/Honeypot_(computing).
Wikipedia, Honeytoken, downloaded on Jul. 26, 2018, 2 pages. https://en.wikipedia.org/wiki/Honeytoken.
Zhao, Applying Digital Watermarking Techniques to Online Multimedia Commerce, in: Proc. of the International Conference on Imaging Science. Systems, and Application (CISSA97), Jun. 30-Jul. 3, 1997, Las Vegas, 7 pages.
Gamba, Julien et al., "Exploring Anycast-Based Public DNS Resolvers", in: The 18th ACM Internet Measurement Conference (ACM IMC 2018), Oct. 31-Nov. 2, 2018, Boston, MA, USA, Accessed Mar. 4, 2019 at http://eprints.networks.imdea.org/1910/, attached PDF poster with deposit date of Dec. 7, 2018, 2 pages total.
PCT/US2019/046866, International Search Report dated Nov. 17, 2019, 3 pages.
PCT/US2019/046866, Search Strategy dated Nov. 17, 2019, 1 page.
PCT/US2019/046866, Written Opinion dated Nov. 17, 2019, 4 pages.
PCT/US2019/046866, Notification of Transmittal of the International Search Report and the Written Opinion of the International Searching Authority, or the Declaration, dated Nov. 17, 2019, 1 page.
U.S. Appl. No. 10/241,774.
A. McDonald, et al., "403 Forbidden: A Global View of CDN Geoblocking," in Proceedings of the Internet Measurement Conference 2018. ACM, conference Oct. 31 to Nov. 2, 2018, pp. 218-230.
B. Cox, "The ISPs sharing your DNS query data," Jun. 2018, https://blog.benjojo.co.uk/post/ISPs-sharing-DNS-query-data.
B. Vandersloot, et al., "Quack: Scalable Remote Measurement of Application-Layer Censor-ship," in 27th {USENIX} Security Symposium ({USENIX} Security 18), Aug. 15-17, 2018, pp. 187-202.
C. C. Demchak and Y. Shavitt "China's Maxim—Leave no Access Point Unexploited: The Hidden Story of China Telecom's BGP Hijacking," Military Cyber Affairs, vol. 3, No. 1, p. 7, 2018, available at https://scholarcommons.usf.edu/mca/vol3/iss1/7/ and at https://www.eng.tau.ac.il/~shavitt/pub.html.
C. Stoll and J. Connolly, "The Cuckoo's Egg: Tracking a Spy Through the Maze of Computer Espionage," Physics Today, vol. 43, p. 75, 1990.
D. Levin, et al., "Alibi routing," in ACM Sigcomm Computer Communication Review, vol. 45, No. 4. ACM, 2015, pp. 611-624.
E. L. Wong, et al., "Truth in advertising: Lightweight verification of route integrity," in Proceedings of the twenty-sixth annual ACM symposium on Principles of distributed computing. ACM, 2007, pp. 147-156.
K. Bu, et al., "What's (not) validating network paths: A survey," arXiv preprint arXiv:1804.03385, Apr. 2018.
K. Fukuda and J. Heidemann,, "Who Knocks at the IPv6 Door? Detecting IPv6 Scanning," in Proceedings of the Internet Measurement Conference 2018, Oct. 31 to Nov. 2, 2018, pp. 231-237.

(56) References Cited

OTHER PUBLICATIONS

M. Casado, et al., "Opportunistic measurement: Extracting insight from spurious traffic," in Proc. 4th ACM Workshop on Hot Topics in Networks (Hotnets-IV), 2005.
O. Gasser, et al., "Clusters in the Expanse: Under-standing and Unbiasing IPv6 Hitlists," in Proceedings of the Internet Measurement Conference 2018. ACM, Oct. 31 to Nov. 2, 2018, pp. 364-378.
R. Hofstede, et al., "Flow Monitoring Explained: From Packet Capture to Data Analysis with Netflow and IPFIX," IEEE Communications Surveys & Tutorials, vol. 16, No. 4, pp. 2037-2064, 2014.
R. Sherwood and N. Spring, "Touring the Internet in a TCP Sidecar," in Proceedings of the 6th ACM Sigcomm conference on Internet measurement. ACM, 2006, pp. 339-344.
Ren-Isac, "Passive DNS," https://www.ren-isac.net/member-resources/pDNS.html, downloaded Oct. 15, 2020, project listed as available as of 2016.
S. Mann, et al., "Sousveillance: Inventing and Using Wearable Computing Devices for Data Collection in Surveillance Environments," Surveillance & society, vol. 1, No. 3, pp. 331-355, 2003.
S. Mann, et al., "Sousveillance: Inverse Surveillance in Multimedia Imaging," in Proceedings of the 12th annual ACM international conference on Multimedia. ACM, 2004, pp. 620-627.
V. Yegneswaran, et al., "P. Barford, and D. Plonka", "On the Design and use of Internet Sinks for Network Abuse Monitoring," in International Workshop on Recent Advances in Intrusion Detection. Springer, 2004, pp. 146-165.
IDS Transmittal Letter, Oct. 15, 2020, submitted herewith.

\* cited by examiner

NONCE INJECTION AND OBSERVATION SYSTEM FOR DETECTING EAVESDROPPERS

BACKGROUND

Technical Field

This document relates generally to information privacy and security; more particularly it relates to methods and system for detecting eavesdroppers of network traffic.

Brief Description of the Related Art

The Internet has poor privacy in that it allows users' traffic to be inspected or classified trivially by examining clear-text portions of DNS and HTTP/HTTPS traffic, or by leveraging knowledge of IP address use in WWW infrastructure. Unfortunately, this allows a man in the middle to know which site(s) a user is visiting. A number of works in the research literature leverage these privacy vulnerabilities, and some are even available for use in commercial products such as traffic analyzers and other middle-boxes.

In the future, it is likely that the Internet traffic will be subject to classification using packet metadata: that is, IP addresses, DNS information, and SNI strings. Two reasons for that are the growing volume of HTTP-based application protocols, and the rapid adoption of HTTP encryption (through HTTPS, HTTP/2, and QUIC). Due to encryption, Deep Packet Inspection becomes decreasingly effective (except for the TLS handshake).

It is an objective of the teachings hereof to increase privacy and enhance security for internet users and website operators, as well as for Internet platform operators, such as ISPs and CDNs. Many things could be done to further this aim, including making protocol and infrastructure modifications and adopting privacy and security best practices, such as dynamic network address assignment and minimizing use of cleartext. However, a fundamental issue is to understand who or what may be watching traffic. The teachings hereof are directed to techniques to detect network eavesdroppers. This knowledge is a foundation for enhanced intelligence, privacy enhanced transport and routing, and of privacy as a service offering.

The teachings hereof address these and other needs that will become apparent in view of the teachings hereof.

BRIEF DESCRIPTION OF THE DRAWINGS

The invention will be more fully understood from the following detailed description taken in conjunction with the accompanying drawings, in which.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

Any description of advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, HTTP versions 1.1 and 2, DNS, TCP/IP, TLS, and UDP, is assumed. The term "server" is used herein to refer to hardware (a computer configured as a server, also referred to as a "server machine") with server software running on such hardware (e.g., a web server). In addition, the term "origin" is used to refer to an origin server. Likewise, the terms "client" and "client device" is used herein to refer to hardware in combination with software (e.g., a browser or player application). While context may indicate the hardware or the software exclusively, should such distinction be appropriate, the teachings hereof can be implemented in any combination of hardware and software.

Overview

A platform operator such as a CDN service provider can disseminate nonces by introducing them into various aspects of network traffic emanating from (or advertised from) its platform, and then listening for them, thereby detecting eavesdroppers on the Internet.

As used in this document, "nonces" are values that are disseminated into a network in order to detect eavesdroppers. The term "nonce" as used in this document is broader than "a number used once". A nonce may be numeric, alphanumeric, or otherwise; nonces are contextually appropriate to the network identifier or message in which they are disseminated. A nonce may be used just once, such that is it unique in an absolute sense (e.g., nonces are never re-used). Preferably, however, a nonce may be re-used, infrequently. This means that the nonce is unique in a relative sense: nonces may not be re-used within a particular time period, or may not re-used within a particular time period for the same type of network message or network identifier.

Nonces can be constructed by generating a value randomly or pseudo randomly. In a preferred embodiment, nonces are constructed to be unique within a particular time period; in a multi-tenant platform (where the teachings hereof are provided as a service to customers), a nonce can be constructed to be unique to a tenant. More details about nonce construction will be provided later in this document.

Preferably, a nonce is disseminated by incorporating it into some aspect of network traffic. For example, a nonce can be placed in a network identifier such as an IP address or domain name label. Such nonce-laden network identifiers are referred to in this document as "ephemeral identifiers" or equivalently as "short lived identifiers", due to the aforementioned limited re-use (or no re-use) of a given nonce. As mentioned above, the form of a nonce is appropriate to its context, e.g., a nonce might be a 64-bit suffix in an IPv6 address, but might be a string of alphanumeric and other permissible characters in a domain name.

Given the great variety of network identifiers, protocols, and message types, there are a wide variety of ways to disseminate nonces. In TLS encrypted traffic, for example, nonces can be embedded in identifiers such as IP addresses or hostnames, or in the TLS server name indication (SNI) field. Nonces also can be embedded in encrypted fields (e.g., to assess whether an eavesdropper has managed to obtain the nonce via decryption of the message). In clear text use cases, nonce-laden identifiers might be inserted into URLs, the headers or bodies of HTTP messages, or into any content in an application layer message, including in markup language (e.g., HTML) documents, Javascripts, JSON data, hidden or non-operational content (like comments in HTML or scripts), or the like.

Nonces can also be disseminated by incorporating them into aspects of network traffic other than network identifiers. For example, a nonce could be inserted into an unused transport layer, network layer, or other protocol fields. The teachings hereof prefer incorporation of a nonce into a network identifier, as this is particularly useful, but the teachings are not limited to this approach.

A nonce-laden identifier (the "ephemeral identifier") is preferably disseminated for a limited period of time by the CDN or other platform. It may be disseminated just once (in one packet), or for the duration of one transaction (a set of related packets), or for some fixed time such as an hour, or the duration that a service is made live on a given address. Then, the ephemeral network identifiers are not disseminated again for some longer window of time (e.g., a year or "forever"), while the platform "waits" and listens for those ephemeral identifiers, ostensibly propagated by an eavesdropper.

The nonce may "return" to the platform because an eavesdropper observes a nonce in an ephemeral identifier and decides to actively probe and/or query that identifier or more specifically, a network endpoint associated therewith. While nonces may not correspond to real hosts or services, an eavesdropper will not know that. As will be apparent from the discussion above, the nonces can be embedded in traffic in such a way that eavesdropper nonce probes are likely to be directed to the platform. The transmission of a nonce by an eavesdropper—and indeed anyone other than the disseminating entity—is referred to herein as "propagating" the nonce. Propagation includes, without limitation, probing or querying an ephemeral identifier.

The dissemination of a nonce by the platform is stored with "nonce metadata" reflecting circumstances under which the nonce was disseminated. For example, a log might include the nonce, the ephemeral identifier, the network device and/or the service that sent the nonce, and/or the destination address to which the nonce was sent. A log could also contain additional information collected at the time of nonce dissemination, such as the results of a traceroute to the destination IP address, or the results of other tests.

Information about an eavesdropper's probe is captured and (similarly) logged with nonce metadata regarding those circumstances. Correlating the circumstances under which the nonce was disseminated and under which it was observed to "propagate", a set of intelligence about who is eavesdropping on what portions of the Internet can be derived. Because of the limited-time dissemination of a given nonce, it can be established with a high degree of confidence that an eavesdropper possessing a given nonce must have obtained it from listening in on the prior dissemination of that given nonce.

Preferably, a platform detects propagation of not only the ephemeral identifier(s) that were disseminated but also related ones. For instance, if the platform disseminates the nonce-laden ephemeral identifier 2001:db8::dead:beef as source address (where 0xdeadbeef is a 64-bit nonce and the preceding portion is dictated by the context, i.e., IPv6 address), then platform devices can listen for that ephemeral identifier in various forms:

(1) as an IPv6 destination address (binary 128-bit network ordered number)
(2) as a series of DNS labels in a query or answer, e.g., "f.e.e.b.d.a.e.d.0.0.0.0.0.0.0.0.0.0.0.0.0.0.0.0.8.b.d.0. 1.0.0.2.ip6.arpa"
(3) as a text string, i.e., "2001:db8::dead:beef," in a database or log, e.g., google search, Passive DNS, etc.

In the latter two cases, one can detect the presence of the ephemeral identifier and/or its nonce in identifiers of other form.

Collected intelligence on eavesdroppers can be put to a variety of uses. One example is to avoid placing cleartext or non-obfuscated data into fields for which eavesdropping was detected. In another embodiment, the intelligence can be used to route traffic around the network infrastructure of eavesdroppers, or to encapsulate (e.g., as an encrypted payload) traffic that must flow through eavesdropper plagued network links. In yet another embodiment, the intelligence can be used to determine a reputation for eavesdropper equipment, e.g., their hosts or networks—and treat traffic involving them differently when interacting with real (not nonce-laden) services. Such different treatments may involve denying or rate-limiting access if terms of service disallow eavesdropping as an invasion of privacy.

With the foregoing by way of overview, detailed examples are provided below.

It is noted that the notion of a 'platform' here is broad and not limited to CDNs. The techniques herein can be advantageously applied by large platforms such as ISPs, CDNs and overlay networks and the like. Due to their pervasive scale, applying the techniques hereof is easier as a practical matter. However, smaller entities can still benefit from the teachings hereof. An individual website operator, for example, could introduce nonces in certain traffic and then observe if and how those nonces were observed returning in messages directed to their network deployments.

Example of Nonce Dissemination in DNS and WWW Traffic

Figure 1:
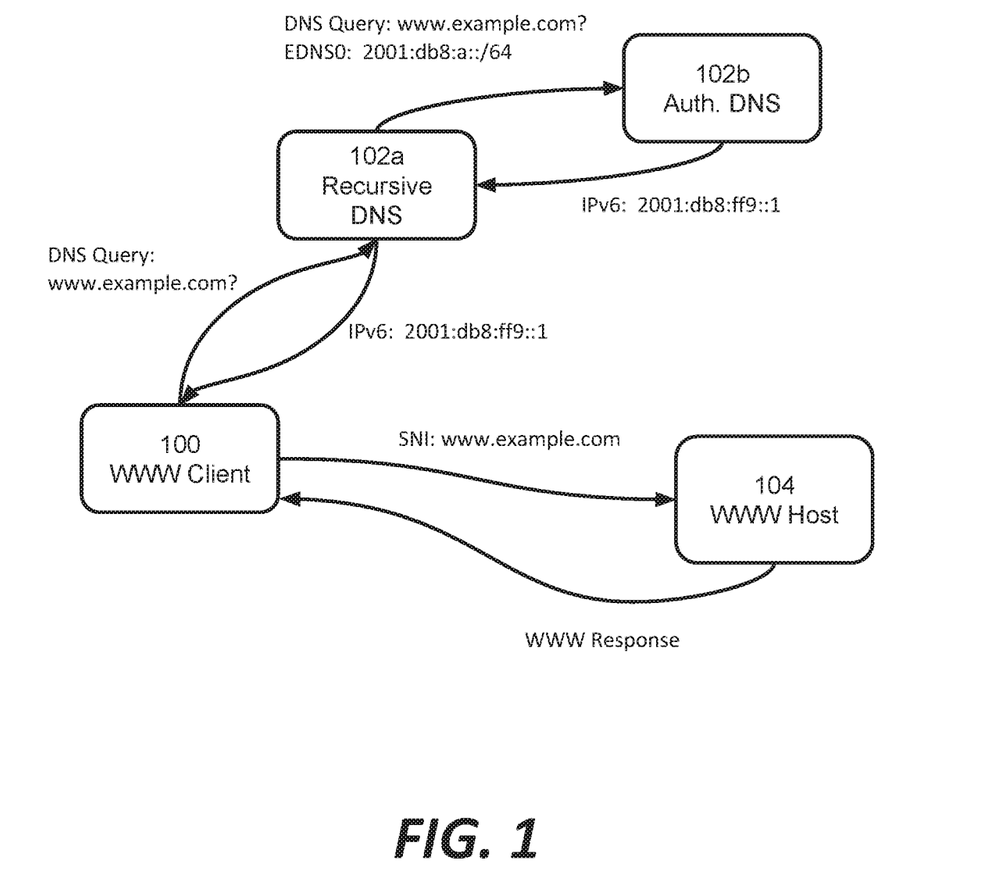
FIG. 1 is a block diagram illustrating one embodiment of a system in accordance with the teachings hereof.

As mentioned above, there are a variety of ways to introduce nonces into network traffic. FIG. 1 is an diagram showing the potential points for injection of nonces into a DNS query and answer process and a WWW client-server message exchange.

At the outset, it is notable that FIG. 1 illustrates several points at which an eavesdropper can glean information about the WWW client's 100 network activity. The traffic (represented by the arrows) typically travels over the 'public' Internet, traversing any number of networks and peering points and associated gateways, deep packet inspection devices, firewalls, routers, or other network devices. The traffic between the WWW client 100 and the recursive resolver 102a is sometimes confined to the user's ISP or to a corporate LAN, but with public (open) DNS services becoming more popular, even this traffic is increasingly traveling over the public Internet.

An eavesdropper on one of the network links (which are indicated by the arrows in FIG. 1), or within the 102a recursive DNS service, is able to see DNS queries and thus cleartext portions of those queries. They may be able to see the hostname that the user wants to resolve, the client's IP address or EDNS0 subnet, as well as the DNS responses and thus the IP address(es) associated with that hostname. An eavesdropper can also see the SNI field accompanying the HTTP request from the client 100 to the WWW host 104 and thus the hostname that the user is visiting, along with the IP address of the WWW host 104 in the destination IP address field.

Figure 2:
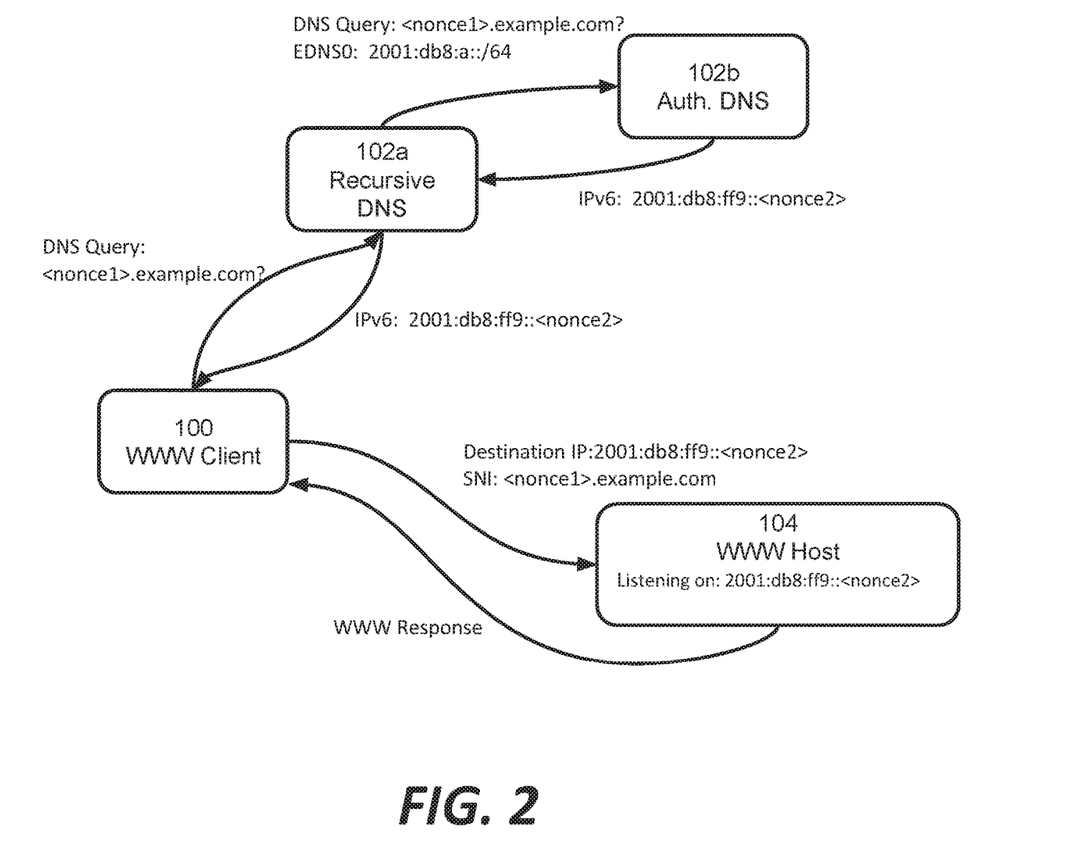
FIG. 2 is a block diagram illustrating the system of FIG. 1 with nonce injection.

With reference to FIG. 2, assume, for example, that an entity controls the client 100, the authoritative DNS 102b, and the WWW host 104. This is referred to generically as the "platform". This is practical for many internet infrastructure providers, without limitation, including CDNs.

A hostname with a nonce embedded therein is configured in the platform. The nonce could be placed in any subdomain label(s) of the hostname or spanning subdomain labels, for example. In FIG. 2, the example is given as <nonce1>.example.com, where the nonce is any set of characters permitted in DNS. This hostname is what was described before as the ephemeral identifier. A DNS query for this hostname will by normal operation of the domain name system come to the platform's authoritative server 102b as authority for the example.com domain. Of course, the nonce could be placed in the fourth level domain name or any lower level name, alternatively. If the platform is a registrar, then it could even register a second level domain name with the nonce.

As shown in FIG. 2, the client 100 resolves the nonce-carrying hostname by contacting its recursive DNS 102a with a DNS query. The client 100 records the nonce that was sent and nonce metadata, e.g., information about the circumstances surrounding its dissemination, such as the date/time, recipient entity (IP address or other). In some embodiments, the client 100 can (at the time of using the nonce) perform certain network tests, such as a traceroute or reverse traceroute to the intended recipient. This information can also be recorded, as it indicates the network path that the client expects the nonce 100 to take.

The nonce-carrying hostname is received at DNS 102a and a normal DNS resolution process occurs. The DNS query will come to the platform's authoritative DNS 102b. The platform configures its authoritative DNS 102b to respond to the nonce-carrying hostname with a nonce-carrying DNS response. This means that the DNS response carries an IP address unique to this DNS response. Preferably, an IPv6 address can contain a unique nonce in the IPv6 interface identifier. FIG. 2 illustrates this example as "IPv6: 2001:db8:ff9::<nonce2>". This is another ephemeral identifier. (A nonce could be embedded in an IPv4 address, although the increasingly limited availability of IPv4 addresses makes this increasingly less preferred.)

As did the client 100, the authoritative DNS 102b of the platform records nonce metadata for this nonce, including the date/time, recipient, the nonce-carrying hostname that was queried, results of network tests, etc.

The nonce-laden DNS response travels back to recursive DNS 102a and to the client 100, which uses it to make, generate, and send a HTTP request for service to the WWW host 104, also controlled in this example by the platform. In the HTTP request, which is preferably encrypted using the well-known TLS protocol, the client 100 includes the nonce-laden hostname into the SNI field, meaning that the hostname will be carried in cleartext to the WWW host 104. Again, the client 100 records nonce metadata for this nonce.

As those skilled in the art will appreciate, there are a wide variety of different message fields and/or identifiers in which the platform can embed a nonce in the system of FIG. 2 for dissemination in the network. A non-exhaustive list of examples includes:

IP addresses
Domain name labels
IPv6 headers (destination service, source client)
TLS SNI
HTTP Host header
HTTP redir header
Peer-to-peer directories (e.g., Distributed Hash Tables)
DNS query names
DNS answers
ip6.arpa and in-addr.arpa reverse DNS queries or answers
URLs
HTML documents (e.g., HREF)
SMTP headers, e.g., received header host names or IP addresses In some embodiments, the client 100 could make a non-encrypted HTTP request to the WWW host 104 so that the nonce-laden hostname is in the clear in the HTTP host header. In such a cleartext HTTP request, an additional nonce (not shown in FIG. 2) could be injected into another HTTP header (e.g., the user-agent) or an HTTP POST body; cleartext HTTP would also mean that the WWW host 104 could embed yet another nonce in the WWW response (e.g., as part of the HTTP headers, or in HTML markup).

Generalizing, any transport endpoint can be specified with an embedded nonce. Any of the foregoing examples of places to embed a nonce can be disseminated independently or in any desired combination.

Nonce Observation

The platform now waits for an eavesdropper to propagate the nonces that were disseminated in FIG. 2. This is a matter of observing the logs on the platform's devices to find the nonce (or more specifically, the ephemeral identifier carrying the nonce). For example, a platform monitoring system can periodically search in the aggregated logs of the DNS 102b, WWW host 104, and/or other platform devices and/or services.

Some places in which the nonce-laden hostname may appear include: a DNS request, a whois query. Some places in which the nonce-laden IP address of the host 104 may show up include: a reverse-DNS lookup, packets addressed to that IP address 104 received at the host, a ping or other network probe targeting that IP address. These are referred to herein as potential nonce observation endpoints. Generalizing, nonce observation endpoints include any and all places where a nonce-laden identifiers could be stored or propagated. Further examples of nonce observation endpoints include, without limitation: application and systems access logs, CDN logs, middleboxes (e.g., firewalls), databases (e.g., those sold by security firms to track activity or determine reputation of network actors over time), Internet search databases (e.g., Google search), social and messaging networks (e.g., those frequented by malicious actors that exchange or sell host and network information), packet traces (by other eavesdroppers), network element (e.g. router, proxies) configurations or caches, and end hosts that may have their security compromised and are storing or unusually reusing nonce-laden identifiers.

If and when the nonce is observed in the logs, the system matches the records about how and with whom the nonce was disseminated with the observations. Given the limited dissemination of a unique nonce, subsequent use (re-use) of the nonce can indicate that an eavesdropper was present on one or more of the network links on which the nonce was carried. Hence, because the nonce was disseminated only once, the entity who was observed to inquire about the nonce can be identified with high probability as being (i) an eavesdropper on one or more of those network links, or (ii) an entity who is receiving information (e.g., by data feed, contractual arrangement or otherwise) from such an eavesdropper.

Example of Nonce Dissemination in RUM Traffic

RUM refers to real user monitoring, which is a performance measurement technique that relies on an end user client (e.g., a browser) making certain performance measurements as it loads a web page and reporting those measurements back to the page owner or their designee for performance analysis. Today, RUM typically leverages the W3C's Navigation Timing and Resource Timing interfaces. Javascript code in a web page invokes these APIs to cause the browser to gather timestamps marking the occurrence of certain important processes, such as DNS lookups, download times, and rendering times, including browser events such as the page onLoad event. More information about RUM systems can be learned by consulting U.S. Pat. No. 9,736,258, the teachings of which are hereby incorporated by reference for all purposes.

Figure 3:
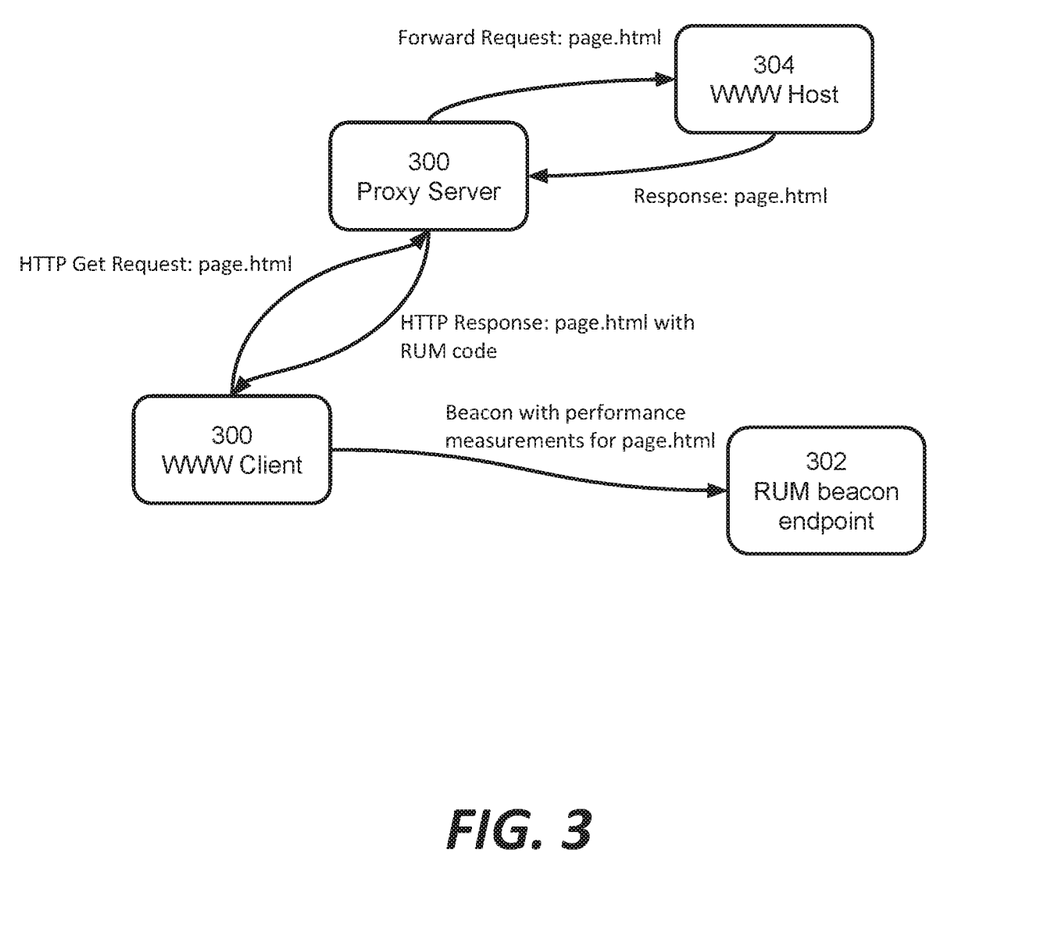
FIG. 3 is a block diagram illustrating another embodiment of a system in accordance with the teachings hereof.
Figure 4:
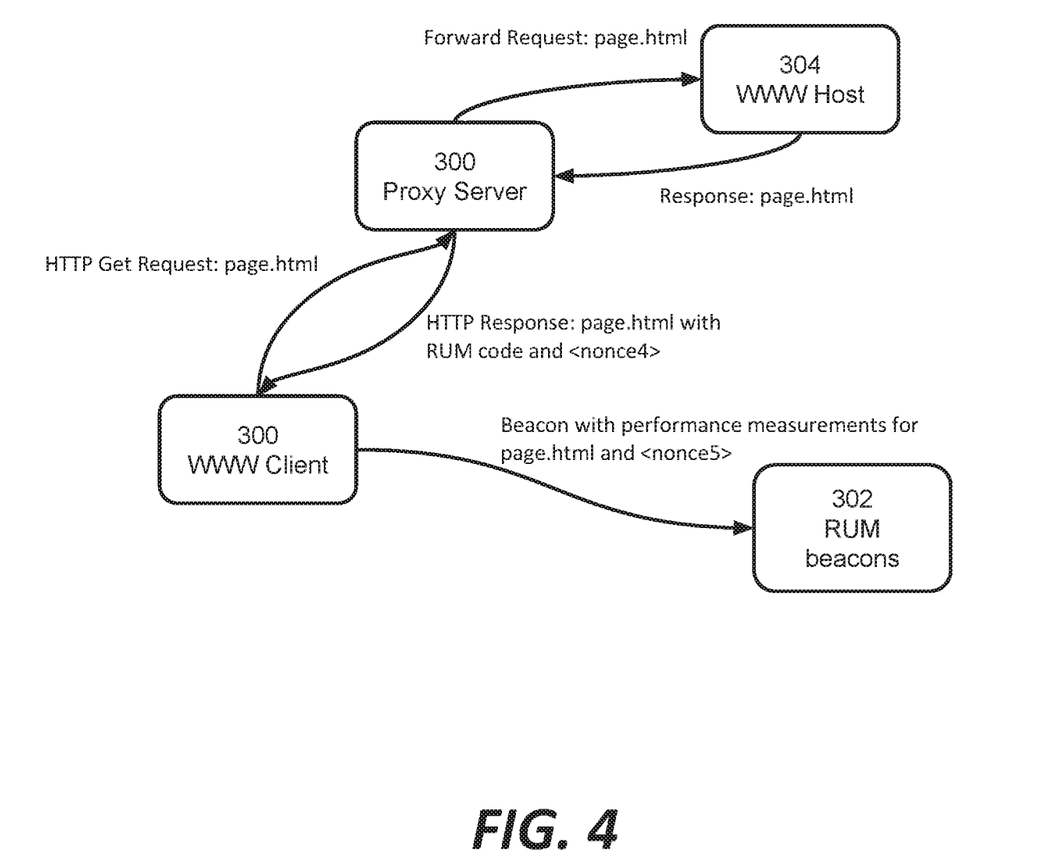
FIG. 4 is a block diagram illustrating the system of FIG. 3 with nonce injection.

FIGS. 3 and 4 illustrate how a CDN or other similarly situated platform can embed nonces in a RUM traffic flow. FIG. 3 shows a basic RUM system for a website that is being delivered by the proxy servers (e.g., 300) of a CDN on behalf of WWW host 304. The client 100 requests a web page (or more specifically, an HTML document defining the presentation layer of a web page) from the proxy 300. The proxy 300 retrieves the HTML document from an origin server (WWW host 304) in a well-known forward request operation. Before serving the document to the client 100, however, the proxy inserts a RUM script into the HTML, preferably as a Javascript object. The modified HTML is sent to the client 100, which loads the page, executes the Javascript, which causes it to send a beacon with the RUM performance information to a designated endpoint 302. The endpoint 302 will gather beacons from many clients and aggregate them into performance statistics suitable for visualization or other other reporting to the website owner.

FIG. 4 illustrates the same message flow but with nonces. In this case, the proxy 300 modifies the HTML document with the RUM script. The RUM script includes a hostname pointing to the beacon endpoint 302, e.g., <nonce4>.beaconhost.com, the ephemeral identifier. The client 100 will need to resolve this hostname and thus an eavesdropper may see it as part of name resolution in the DNS system. The client 100 can also put the nonce-laden beacon hostname in an SNI field when using the beacon to host 302; this is additional traffic that an eavesdropper may see. If acceptable, the proxy 300 to client 100 and client 100 to host 302 could be unencrypted, providing more opportunities to embed a nonce. For example, a nonce could be inserted into the HTML markup itself—e.g., in a comment, hidden link, or other field—for an eavesdropper to find. A nonce could be placed in the body of the unencrypted beacon, as well (i.e., the RUM script could direct the client to generate a beacon with a nonce therein).

As with prior examples, after nonce injection, the RUM platform owner waits to see if nonces are returned, as in subsequent use (re-use) or propagated, e.g., to a database or data feed. Nonces may be observed at any one of the nonce observation endpoints mentioned previously.

Example of Nonce Injection in Transport or Network Protocols

As mentioned previously, It is possible to insert nonces into any of a wide variety of fields defined in transport layer or network layer protocols. These may include (without limitation) fields that are otherwise designated as "future use" or "optional" in a protocol specification, or that are not meaningful in the context of the particular message being sent. A distributed platform with many Internet points of presence can insert, from time to time, nonces into network messages between its servers, in order to see if an eavesdropper picks them up. Examples of fields in which nonces could be carried include any of the fields identified earlier:

IP addresses
Domain name labels
IPv6 headers (destination service, source client)
TLS SNI
HTTP Host header
HTTP redir header
Peer-to-peer directories (e.g., Distributed Hash Tables)
DNS query names
DNS answers
ip6.arpa and in-addr.arpa reverse DNS queries or answers
URLs
HTML, documents (e.g., HREF)
SMTP headers, e.g., received header host names or IP addresses Nonce observation endpoints for this kind of nonce injection include any and all places where a nonce-laden identifier could be stored or propagated, and include any of the prior examples given for nonce observation endpoints. The notice observation endpoint need not be tied to the same type of network message or application layer function in which the nonce was disseminated.

Privacy as a Service

A CDN or other platform can offer privacy as a service based on the intelligence gleaned from nonce dissemination and observation.

One example is an intelligence gathering service. A given CDN customer may opt to have notices inserted into its traffic so as to detect and identify eavesdroppers on its traffic. This means that the CDN would configure its servers to place nonces into hostnames, IP addresses, RUM beacons or otherwise for traffic associated with that given customer. The CDN could do so insofar as it handles the HTTP traffic for the customer, or to the extent it handles the DNS traffic for the customer. The CDN would then provide reports to the customer indicating how its nonces had been injected (disseminated), and how the nonces had been observed to return (propagated) from eavesdroppers.

Figure 5:
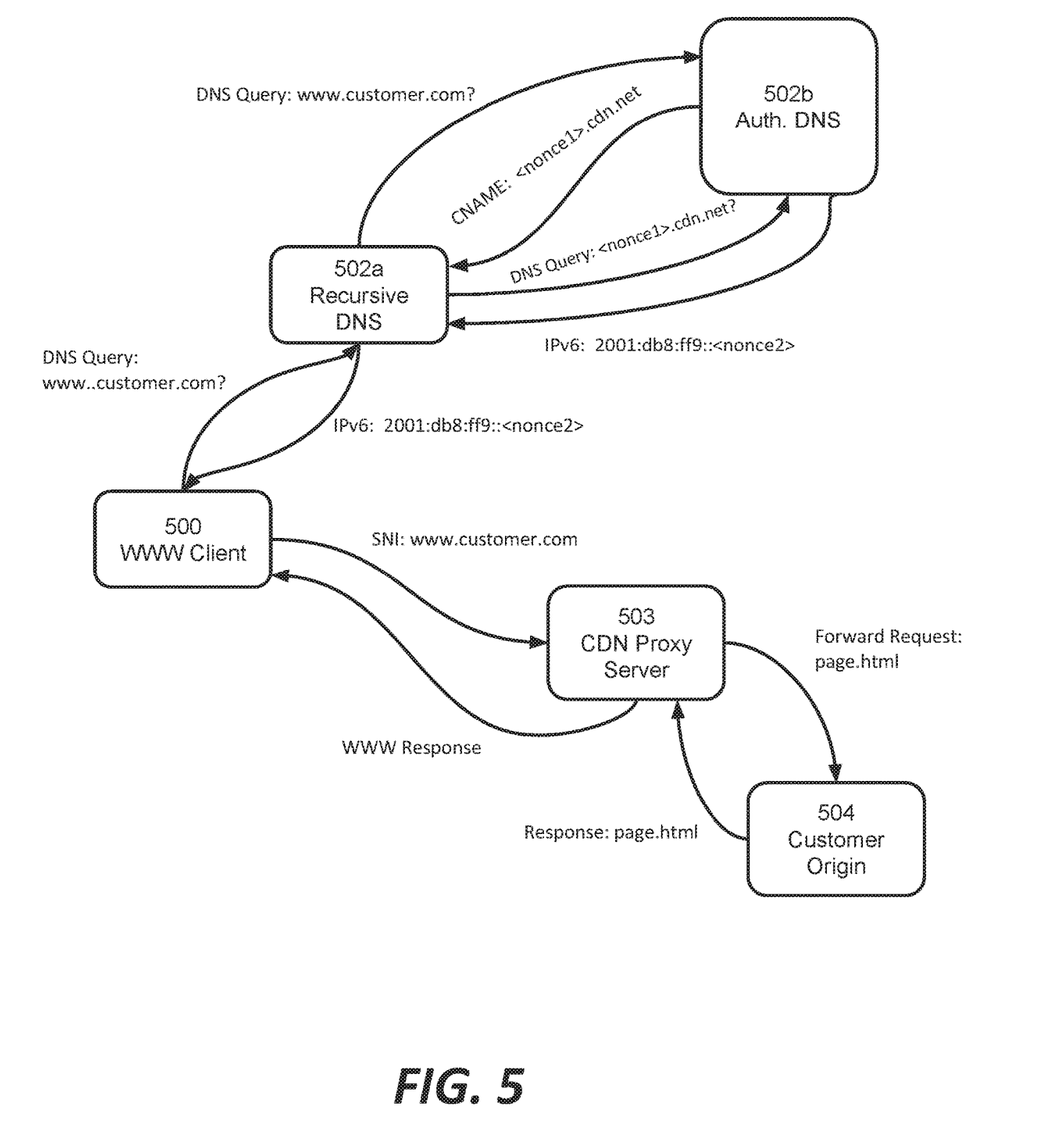
FIG. 5 is a block diagram illustrating an alternate embodiment to FIG. 2.

FIG. 5 is a modified version of FIG. 2 illustrating how the CDN can disseminate nonces into the customer's traffic. In FIG. 5, the CDN provides the proxy 503 and DNS services (502b) for the customer. The customer operates its origin server 504. The recursive DNS server 502 is operated by an ISP and the client 500 is an individual end user's client. In addition to those places identified earlier, FIG. 5 illustrates yet another place that a nonce can be injected; in the CNAME handed out by a DNS system controlled by the CDN.

A second example of privacy as a service is privacy enhanced routing. A CDN functions as an overlay network and utilizes many techniques to route traffic in improved ways over the Internet, as known in the art. A CDN can incorporate nonce-derived intelligence to affect this routing for customers. Assume that nonce intelligence shows that an eavesdropper is active on certain links on the Internet, or in certain networks, countries, or geographies. The CDN can use this information to route traffic on alternate paths around the eavesdroppers. The re-routed traffic may be any traffic that the CDN handles for the customer. Such re-routing can be accomplished by, among others things: (i) adjusting DNS answers to direct an end user client to a CDN proxy server that is not in path with an eavesdropper; (ii) encapsulating packets into the CDN's overlay network and routing them across the overlay and around the eavesdropper (for more background on overlays, see U.S. Pat. Nos. 7,660,296 and 6,820,133, the teachings of which are hereby incorporated by reference for all purposes), (iii) tunneling packets to a controlled endpoint across a network/geography/country with eavesdroppers, e.g., encrypting the customer packet as payload. This can be done using GRE or other known techniques.

A third example is to block or limit contact with the network links, hosts, or services identified as being associated with an eavesdropper. For example, a cloud-based web application firewall (see, U.S. Pat. No. 8,458,769, the contents of which are incorporated by reference herein) could be configured prevent end user clients from connecting to specific servers or cloud services that seem to indiscriminately collect and store or propagate, e.g., in a database, records of arbitrary connections, say beyond what is required by law.

Nonce Construction; Tamper Detection

A nonce can be constructed in wide variety of ways. Preferably, nonce construction is performed in accord with the principles and guidelines set forth below.

A random value can be used as appropriate for the field and/or message where the nonce will be disseminated. In one embodiment, construction of notices is such that they are opaque to eavesdroppers and such that no pertinent information is clearly represented within them, e.g., pseudorandom or encoded in such a way that they are practically indifferentiable from random, i.e., unlikely to be predictable and thus unlikely to be disseminated by an actor other than an eavesdropper.

In a preferred embodiment, a nonce is constructed so as to be unique within a specified (user-configured) time period. Using this approach, it is difficult for actors (eavesdroppers or otherwise) to predict a nonce, even if that actor has knowledge of the algorithm/method employed to generate them or knowledge of nonces previously disseminated, i.e., the nonces are plausibly pseudo random or semantically opaque, e.g., constructed by encryption with a private key.

In some embodiments, certain information can be encoded into the nonce. For example, a nonce could be generated by hashing the information about the circumstances under which the nonce was disseminated into the network. This hash could be performed under a system wide private key, if desired. It is possible an eavesdropper could modify the nonce, particularly if trying to evade or investigate the nonce-observation system. The platform could maintain an independent record of what was encoded into the nonce, and by comparison with a nonce received from an eavesdropper, detect a mismatch and thereby detect the eavesdropper's tampering, or at least that the nonce represented bad data.

In addition, a nonce may be constructed using known hashing or other structured encoding techniques in a way that might entice an eavesdropper to alter or construct other examples, again enabling detection by their variation. In this way, the detection might, e.g., use pattern-based recognition of propagation or subsequent use. For example, one might disseminate the nonce-laden source IP address 2001:db8:: feed:dead:beef:cafe then listen and subsequently receive a packet for the destination address 2001:db8::feed:dead:beef: caff, that is, the original address plus 1. As this value shares the structure of the original nonce-laden address, differing by one bit, it makes it likely that the latter propagated address was constructed with knowledge of the disseminated (nonce-laden) address and, thus, enables eavesdropping detection. Put another way, nonces can be constructed and analyzed to detect an eavesdropper's use of an algorithm that synthesizes addresses based on nonce-laden "seed" addresses.

Nonce Metadata with TTL Limited Notices

Mentioned previously was the option that a platform device disseminating the nonce could perform network tests and record this information in nonce metadata. Such network tests can include traceroutes, reverse traceroutes, probes of various types.

In one embodiment, the nonce can be disseminated with limited lifetime, i.e., forwarding limited, packets so as to better identify an eavesdropper's location, and this fact can be recorded in nonce metadata. When disseminating a nonce-laden network message, a device can set the "time to live" (TTL, also known as "hop count") of the IP packet to a particular value of interest. The TTL is recorded in the nonce metadata. This limits the number of "hops" that the IP packet will take, because routers decrement the TTL as they relay a packet and stop forwarding when it decrements to zero. In effect, controlling the TTL controls the number of devices that will have an opportunity to see the nonce in the network message. If and when the nonce (used only in the limited lifetime packets) is observed to return to the system, it is known that the eavesdropper is within a certain hop count of the disseminating device. Performing this kind of analysis from multiple points on the Internet and receiving nonces from the same eavesdropper (and thus establishing network hop counts from multiple points) may allow one to uniquely identify an eavesdropper's network location.

Content Delivery Networks

As the teachings hereof can be applied in the context of a CDN, a general overview of CDN components and operation is now provided.

A CDN is a distributed computer system and it can be (but does not have to be) operated and managed by a service provider. A "distributed system" of this type typically refers to a collection of autonomous computers linked by a network or networks, together with the software, systems, protocols and techniques designed to facilitate various services, such as content delivery or the support of site infrastructure. The infrastructure can be shared by multiple tenants, typically referred to as the content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence. The CDN processes may be located at nodes that are publicly-routable on the Internet, within or adjacent to nodes that are located in mobile networks, in or adjacent to enterprise-based private networks, or in any combination thereof.

Figure 6:
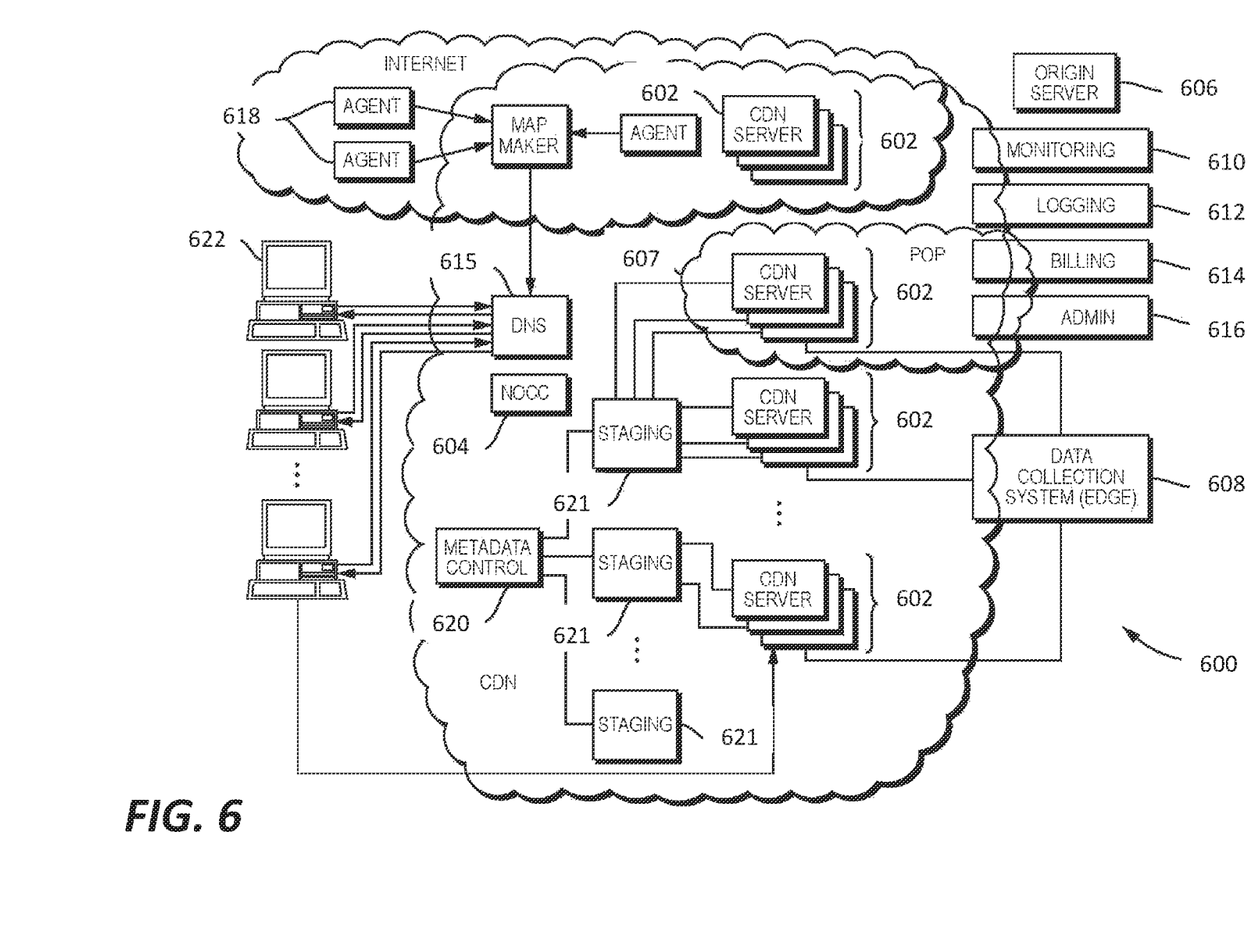
FIG. 6 is a diagram of a content delivery network, in one embodiment.

In a known system such as that shown in FIG. 6, a distributed computer system 600 is configured as a content delivery network (CDN) and is assumed to have a set of machines 602 distributed around the Internet. The machines 602 are servers can be reverse proxy servers and can be the proxy servers 300, 503 shown in FIGS. 3, 4, 5.

A network operations command center (NOCC) 604 may be used to administer and manage operations of the various machines in the system. Third party sites affiliated with content providers, such as web site 606, offload delivery of content (e.g., HTML or other markup language files, embedded page objects, streaming media, software downloads, and the like) to the distributed computer system 600 and, in particular, to the servers 602 (which are sometimes referred to as content servers, or sometimes as "edge" servers in light of the possibility that they are near an "edge" of the Internet). Such servers may be grouped together into a point of presence (POP) 607.

Typically, content providers offload their content delivery by aliasing (e.g., by a DNS CNAME) given content provider domains or sub-domains to domains that are managed by the service provider's authoritative domain name service. End user client machines 622 that desire such content may be directed to the distributed computer system to obtain that content more reliably and efficiently. The CDN servers respond to the client requests, for example by obtaining requested content from a local cache, from another CDN server, from the origin server 106, or other source.

Although not shown in detail in FIG. 6, the distributed computer system may also include other infrastructure, such as a distributed data collection system 608 that collects usage and other data from the CDN servers, aggregates that data across a region or set of regions, and passes that data to other back-end systems 610, 612, 614 and 616 to facilitate monitoring, logging, alerts, billing, management and other operational and administrative functions. Distributed network agents 618 monitor the network as well as the server loads and provide network, traffic and load data to a DNS query handling mechanism 615, which is authoritative for content domains being managed by the CDN. A distributed data transport mechanism 520 may be used to distribute control information (e.g., metadata to manage content, to facilitate load balancing, and the like) to the CDN servers.

A given server in the CDN comprises commodity hardware (e.g., a microprocessor) running an operating system kernel (such as Linux® or variant) that supports one or more applications. To facilitate content delivery services, for example, given machines typically run a set of applications, such as an HTTP proxy, a name server, a local monitoring process, a distributed data collection process, and the like. The HTTP proxy (sometimes referred to herein as a global host or "ghost") typically includes a manager process for managing a cache and delivery of content from the machine. For streaming media, the machine typically includes one or more media servers, as required by the supported media formats.

A given CDN server 602 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN.

In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server associated with the IP address. The request includes a Host header that includes the original content provider domain or sub-domain. Upon receipt of the request with the Host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based "metadata" configuration file, as described previously. Thus, the domain name or subdomain name in the request is bound to (associated with) a particular configuration file, which contains the rules, settings, etc., that the CDN server should use for that request.

As an overlay, the CDN resources may be used to facilitate wide area network (WAN) acceleration services between enterprise data centers (which may be privately managed) and to/from third party software-as-a-service (SaaS) providers.

CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud (e.g., from a SaaS provider). To accomplish these two use cases, CDN software may execute on machines (potentially in virtual machines running on customer hardware) hosted in one or more customer data centers, and on machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the CDN service provider's other infrastructure (e.g., network and operations facilities). This type of managed solution provides an enterprise with the opportunity to take advantage of CDN technologies with respect to their company's intranet, providing a wide-area-network optimization solution. This kind of solution extends acceleration for the enterprise to applications served anywhere on the Internet. By bridging an enterprise's CDN-based private overlay network with the existing CDN public internet overlay network, an end user at a remote branch office obtains an accelerated application end-to-end.

The CDN may have a variety of other features and adjunct components. For example the CDN may include a network storage subsystem (sometimes referred to herein as "NetStorage") which may be located in a network datacenter accessible to the CDN servers, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. Communications between CDN servers and/or across the overlay may be enhanced or improved using techniques such as described in U.S. Pat. Nos. 6,820,133, 7,274,658, 7,660,296, the disclosures of which are incorporated herein by reference.

For live streaming delivery, the CDN may include a live delivery subsystem, such as described in U.S. Pat. No. 7,296,082, and U.S. Publication No. 2011/0173345, the disclosures of which are incorporated herein by reference.

Computer Based Implementation

The teachings hereof may be implemented using conventional computer systems, but modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 7:
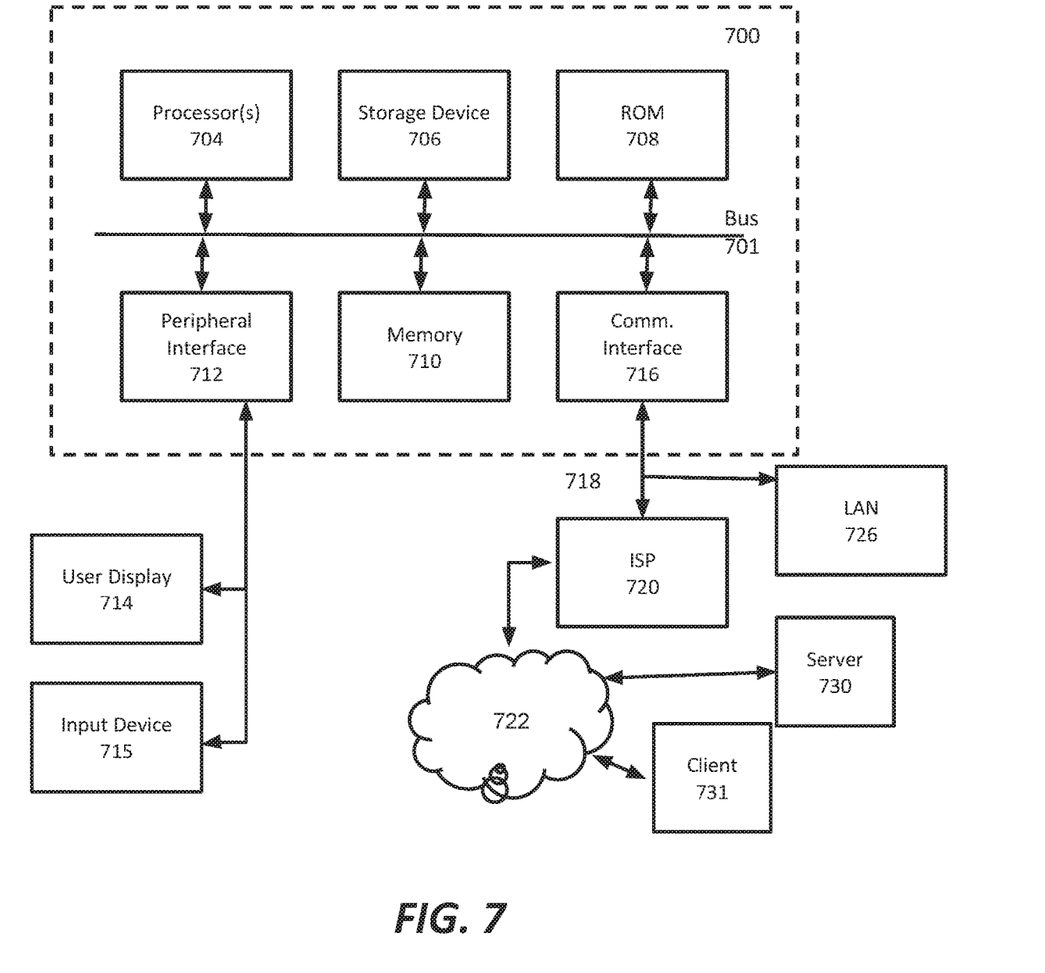
FIG. 7 is a block diagram illustrating hardware in a computer system that may be used to implement the teachings hereof.

FIG. 7 is a block diagram that illustrates hardware in a computer system 700 upon which such software may run in order to implement embodiments of the invention. The computer system 700 may be embodied in a client device, server, personal computer, workstation, tablet computer, mobile or wireless device such as a smartphone, network device, router, hub, gateway, or other device. Representative machines on which the subject matter herein is provided may be Intel-processor based computers running a Linux or Linux-variant operating system and one or more applications to carry out the described functionality.

Computer system 700 includes a microprocessor 704 coupled to bus 701. In some systems, multiple processor and/or processor cores may be employed. Computer system 700 further includes a main memory 710, such as a random access memory (RAM) or other storage device, coupled to the bus 701 for storing information and instructions to be executed by processor 704. A read only memory (ROM) 708 is coupled to the bus 701 for storing information and instructions for processor 704. A non-volatile storage device 706, such as a magnetic disk, solid state memory (e.g., flash memory), or optical disk, is provided and coupled to bus 701 for storing information and instructions. Other application-specific integrated circuits (ASICs), field programmable gate arrays (FPGAs) or circuitry may be included in the computer system 700 to perform functions described herein.

A peripheral interface 712 communicatively couples computer system 700 to a user display 714 that displays the output of software executing on the computer system, and an input device 715 (e.g., a keyboard, mouse, trackpad, touchscreen) that communicates user input and instructions to the computer system 700. The peripheral interface 712 may include interface circuitry, control and/or level-shifting logic for local buses such as RS-485, Universal Serial Bus (USB), IEEE 1394, or other communication links.

Computer system 700 is coupled to a communication interface 716 that provides a link (e.g., at a physical layer, data link layer,) between the system bus 701 and an external communication link. The communication interface 716 provides a network link 718. The communication interface 716 may represent a Ethernet or other network interface card (NIC), a wireless interface, modem, an optical interface, or other kind of input/output interface.

Network link 718 provides data communication through one or more networks to other devices. Such devices include other computer systems that are part of a local area network (LAN) 726. Furthermore, the network link 718 provides a link, via an internet service provider (ISP) 720, to the Internet 722. In turn, the Internet 722 may provide a link to other computing systems such as a remote server 730 and/or a remote client 731. Network link 718 and such networks may transmit data using packet-switched, circuit-switched, or other data-transmission approaches.

In operation, the computer system 700 may implement the functionality described herein as a result of the processor executing code. Such code may be read from or stored on a non-transitory computer-readable medium, such as memory 710, ROM 708, or storage device 706. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 718 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method performed by a system comprising one or more computers on the Internet, each of which has at least one hardware processor and memory holding computer program instructions for execution on the at least one hardware processor for operating the respective computer, the method comprising:
   with the system:
      generating a nonce and including the nonce in a portion of a first network message;
      sending the first network message to a first computer over one or more network links, the first computer being distinct from the system; and,
      recording information about the sending of the nonce in a nonce record;
   subsequently, the system:
      receiving the nonce in a second network message from a second computer, the second computer being distinct from the system;
      recording information about the second network message from the second computer in a log entry;
      matching the nonce record to the log entry; and,
      determining, based at least in part on the nonce record and the log entry, that the second computer is associated with an eavesdropper on at least one of: (a) the one or more network links over which the first network message was sent to the first computer and (b) the first computer;
   wherein the system sending the first network message comprises at least one of:
      (i) a domain name system (DNS) server sending a DNS answer, where the DNS server inserts the nonce into at least one of an internet protocol (IP) address and a canonical name (CNAME), the DNS answer being in response to a DNS query for a hostname;
      (ii) a proxy server sending a hypertext transfer protocol (HTTP) response, where the proxy server inserts the nonce into at least one of: a real user monitoring (RUM) script, a hypertext markup language (HTML) page, an HTTP header, and HTTP body, wherein the HTTP response comprises at least one of: an HTTP message encrypted according to transport layer security (TLS) or other protocol, an HTTP/2 message, an HTTP.x message where x signifies any version;
      (iii) a client device sending a DNS query, where the client device inserts the nonce into a queried name;
      (iv) a client device sending an HTTP message, where the client device inserts the nonce into at least one of: a server name indication (SNI) field, a destination IP address, an HTTP header, and HTTP body, wherein the HTTP message comprises at least one of: an HTTP message encrypted according to TLS or other protocol, an HTTP/2 message, and an HTTP.x message where x signifies any version; and,
      (v) a client device sending a RUM beacon, where the client device inserts the nonce into the RUM beacon.

2. The method of claim 1, wherein the queried name comprises a hostname.

3. The method of claim 1, wherein the system sending the first network message comprises inserting the nonce into an otherwise unused field in the transport layer or network layer.

4. The method of claim 1, wherein the recording of the information about the sending of the nonce in a nonce record comprises recording at least one of: a nonce value, an identifier carrying the nonce, a time and date of the first network message, a destination of the first network message; and, one or more results of one or more network tests conducted at the time of sending the first network message.

5. The method of claim 1, wherein a connection over which the first network message is sent comprises a transport layer security (TLS) encrypted connection, and the nonce is placed into a cleartext portion of the first network message.

6. The method of claim 1, wherein the generating of the nonce and the including of the nonce in a portion of a first network message comprises inserting the nonce into a network identifier.

7. The method of claim 1, wherein the nonce comprises a limited-time use nonce.

8. The method of claim 1, further comprising:
   in response to said determination that the second computer is associated with an eavesdropper, taking an action, the action comprising reporting the determination to a customer of the system whose content is associated with the first network message.

9. The method of claim 1, further comprising:
   in response to said determination that the second computer is associated with an eavesdropper, taking an action, the action comprising at least one of:
      (i) routing network traffic between two or more computers in the system so as to avoid at least one of: one or more network links associated with the eavesdropper, one or more hosts associated with the eavesdropper, and one or more services associated with the eavesdropper; and
      (ii) encapsulating network traffic traveling across at least one network link associated with the eavesdropper.

10. A method performed by a system comprising one or more computers on the Internet, each of which has at least one hardware processor and memory holding computer program instructions for execution on the at least one hardware processor for operating the respective computer, the method comprising:
    with the system:
       generating a nonce and including the nonce in a portion of a first network message;
       sending the first network message to a first computer over one or more network links, the first computer being distinct from the system; and,
       recording information about the sending of the nonce in a nonce record;
    subsequently, at the system:
       receiving the nonce in a second network message from a second computer, the second computer being distinct from the system;
       recording information about the second network message from the second computer in a log entry;
       matching the nonce record to the log entry; and,
       determining, based at least in part on the nonce record and the log entry, that the second computer is associated with an eavesdropper on at least one of: (a) the one or more network links over which the first network message was sent to the first computer and (b) the first computer;

wherein the sending of the first network message comprises sending at least one Internet Protocol packet, and setting a Time to Live (TTL) in the at least one Internet Protocol packet, so as to limit the distance, in router hops, that the first network message will travel, thus limiting where an eavesdropper might observe the nonce in the first network message; and, the method further comprising the system:
recording information about the TTL when sending of the nonce in the nonce record; and,
in response to the determination that the second computer is associated with an eavesdropper, using at least the recorded information about the TTL, to determine the eavesdropper's possible location(s).

11. The method of claim 10, further comprising, delaying sending of subsequent network messages with the nonce while waiting to receive the nonce in the second network message from the second computer.

12. The method of claim 10, further comprising using arrival time of the second network message from the second computer, to determine the eavesdropper's possible location(s).

13. A system for detecting eavesdroppers on a network, comprising:
one or more computers on the Internet, each of which has at least one hardware processor and memory holding computer program instructions for execution on the at least one hardware processor for operating the respective computer;
the one or more computers in the system holding computer program instructions that, when executed, cause the one or more computers to:
generate a nonce and including the nonce in a portion of a first network message;
send the first network message to a first computer over one or more network links, the first computer being distinct from the system;
record information about the sending of the nonce in a nonce record;
receive the nonce in a second network message from a second computer, the second computer being distinct from the system;
record information about the second network message from the second computer in a log entry;
match the nonce record to the log entry; and,
determine, based at least in part on the nonce record and the log entry, that the second computer is associated with an eavesdropper on at least one of: (a) the one or more network links over which the first network message was sent to the first computer and (b) the first computer;
wherein the first network message comprises at least one of:
(i) a domain name system (DN)S answer to a DNS query for a hostname, with the nonce in at least one of an internet protocol (IP) address and a canonical name (CNAME) in the DNS answer;
(ii) a hypertext transfer protocol (HTTP) response with the nonce in at least one of: a real user monitoring (RUM) script, a hypertext markup language (HTML) page, an HTTP header, and HTTP body, wherein the HTTP response comprises at least one of: an HTTP message encrypted according to transport layer security (TLS) or other protocol, an HTTP/2 message, an HTTP.x message where x signifies any version;

(iii) a DNS query, with the nonce in a queried name;
(iv) an HTTP message, with the nonce in at least one of: a server name indication (SNI) field, a destination IP address, an HTTP header, and HTTP body, wherein the HTTP message comprises at least one of: an HTTP message encrypted according to TLS or other protocol, an HTTP/2 message, and an HTTP.x message where x signifies any version; and,
(v) a RUM beacon, with the nonce in the RUM beacon.

14. The system of claim 13, wherein the queried name comprises a hostname.

15. The system of claim 13, wherein the sending of the first network message comprises inserting the nonce into an otherwise unused field in the transport layer or network layer.

16. The system of claim 13, wherein the recording of the information about the sending of the nonce in a nonce record comprises recording at least one of: a nonce value, an identifier carrying the nonce, a time and date of the first network message, a destination of the first network message; and, one or more results of one or more network tests conducted at the time of sending the first network message.

17. The system of claim 13, wherein a connection over which the first network message is sent comprises a transport layer security (TLS) encrypted connection, and the nonce is placed into a cleartext portion of the first network message.

18. The system of claim 13, wherein the generating of the nonce and the including of the nonce in a portion of a first network message comprises inserting the nonce into a network identifier.

19. The system of claim 13, further comprising:
the one or more computers in the system holding computer program instructions that, when executed, cause the one or more computers to:
in response to said determination that the second computer is associated with an eavesdropper, take an action, the action comprising one or more of:
(i) reporting the determination to a customer of the system whose content is associated with the first network message;
(ii) routing network traffic between two or more computers in the system so as to avoid at least one of: one or more network links associated with the eavesdropper, one or more hosts associated with the eavesdropper, and one or more services associated with the eavesdropper; and
(iii) encapsulating network traffic traveling across at least one network link associated with the eavesdropper.

20. A system for detecting eavesdroppers on a network, comprising:
one or more computers on the Internet, each of which has at least one hardware processor and memory holding computer program instructions for execution on the at least one hardware processor for operating the respective computer;
the one or more computers in the system holding computer program instructions that, when executed, cause the one or more computers to:
generate a nonce and including the nonce in a portion of a first network message;
send the first network message to a first computer over one or more network links, the first computer being distinct from the system;
record information about the sending of the nonce in a nonce record;

receive the nonce in a second network message from a second computer, the second computer being distinct from the system;
record information about the second network message from the second computer in a log entry;
match the nonce record to the log entry; and,
determine, based at least in part on the nonce record and the log entry, that the second computer is associated with an eavesdropper on at least one of: (a) the one or more network links over which the first network message was sent to the first computer and (b) the first computer;
wherein the sending of the first network message comprises sending at least one Internet Protocol packet, and setting a Time to Live (TTL) in the at least one Internet Protocol packet, so as to limit the distance, in router hops, that the first network message will travel, thus limiting where an eavesdropper might observe the nonce in the first network message; and
the one or more computers in the system holding computer program instructions that, when executed, cause the one or more computers to:
record information about the TTL when sending of the nonce in the nonce record; and,
in response to the determination that the second computer is associated with an eavesdropper, use at least the recorded information about the TTL, to determine the eavesdropper's possible location(s).

21. The system of claim 20, comprising using an arrival time of that second message from the second computer, to determine the eavesdropper's possible location(s).

22. One or more non-transitory computer readable mediums holding instructions for execution on one or more hardware processors on one or more computers in a system interconnected over the Internet, the instructions comprising:
instructions for operating the system to:
generate a nonce and including the nonce in a portion of a first network message;
send the first network message to a first computer over one or more network links, the first computer being distinct from the system; and,
record information about the sending of the nonce in a nonce record;
instructions for, subsequently, operating the system to:
receive the nonce in a second network message from a second computer, the second computer being distinct from the system; and,
record information about the second network message from the second computer in a log entry;
match the nonce record to the log entry; and
determine, based at least in part on the nonce record and the log entry, that the second computer is associated with an eavesdropper on at least one of: (a) the one or more network links over which the first network message was sent to the first computer and (b) the first computer; and,
wherein operating the system to send the first network message comprises at least one of:
(i) a domain name system (DNS) server sending a DNS answer, where the DNS server inserts the nonce into at least one of an internet protocol (IP) address and a canonical name (CNAME), the DNS answer being in response to a DNS query for a hostnames;
(ii) a proxy server sending a hypertext transfer protocol (HTTP) response, where the proxy server inserts the nonce into at least one of: a real user monitoring (RUM) script, a hypertext markup language (HTML) page, an HTTP header, and HTTP body, wherein the HTTP response comprises at least one of: an HTTP message encrypted according to transport layer security (TLS) or other protocol, an HTTP/2 message, an HTTP.x message where x signifies any version;
(iii) a client device sending a DNS query, where the client device inserts the nonce into a queried name;
(iv) a client device sending an HTTP message, where the client device inserts the nonce into at least one of: a server name indication (SNI) field, a destination IP address, an HTTP header, and HTTP body, wherein the HTTP message comprises at least one of: an HTTP message encrypted according to TLS or other protocol, an HTTP/2 message, and an HTTP.x message where x signifies any version; and,
(v) a client device sending a RUM beacon, where the client device inserts the nonce into the RUM beacon.

\* \* \* \* \*